F. W. WILLIAMS.
SILO CONSTRUCTION.
APPLICATION FILED MAY 1, 1914.
1,173,074.
Patented Feb. 22, 1916.
2 SHEETS—SHEET 1.
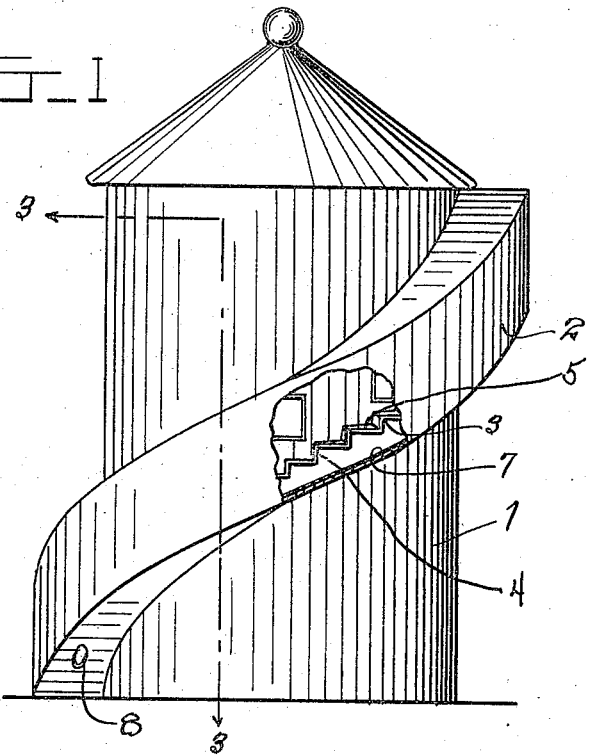
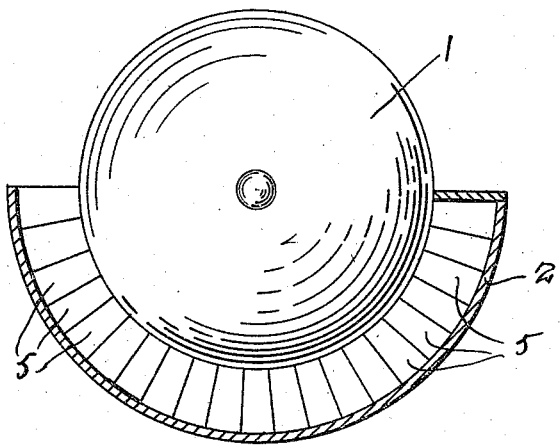
Witnesses
Chas. H. Trotter
Rob't Meyer
Inventor
F. W. Williams
By
Attorney

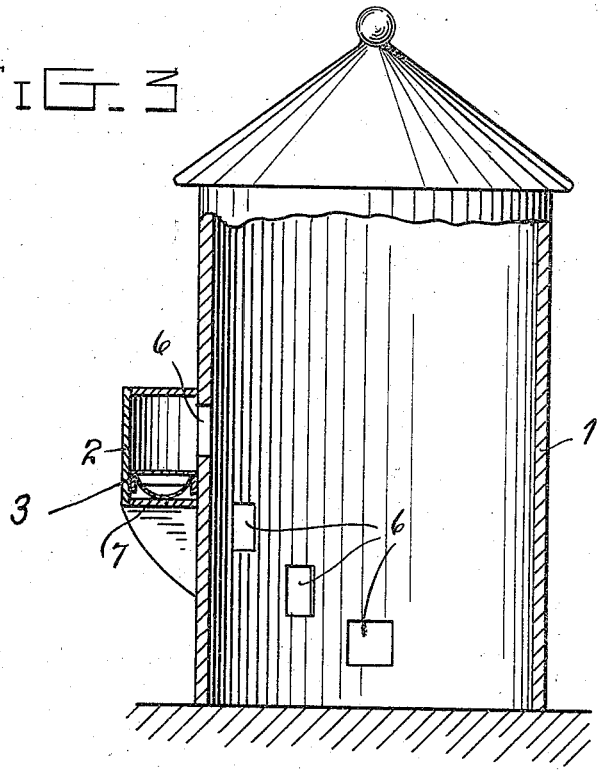
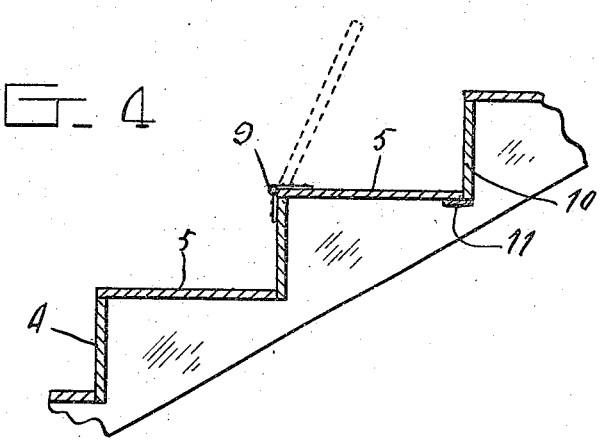

UNITED STATES PATENT OFFICE.

FREDRICK W. WILLIAMS, OF SUMMIT, SOUTH DAKOTA.

SILO CONSTRUCTION.

1,173,074.　　　　Specification of Letters Patent.　　Patented Feb. 22, 1916.

Application filed May 1, 1914. Serial No. 835,660.

*To all whom it may concern:*

Be it known that I, FREDRICK W. WILLIAMS, a citizen of the United States, residing at Summit, in the county of Roberts and State of South Dakota, have invented certain new and useful Improvements in Silo Constructions, of which the following is a specification.

This invention relates to silos, such as are employed for the storage of ensilage used for feed for domestic stock, and the primary object of the invention is the provision of means whereby the ensilage may be conveniently and easily taken from the silo for the purpose of distribution to the domestic animals.

Another object of the invention is the provision of a spiral stairway which winds about the outer surface of the silo construction, and is placed directly beneath a plurality of doors or openings which communicate with the interior of the silo, and to mount a chute beneath the stairway so that the ensilage may be thrown out through the doors into the chute, from whence it slides downwardly into any suitable receptacle preparatory to its distribution to the animals, and to provide trap doors within the steps whereby access may be gained to the chute, which is positioned beneath the steps.

With the foregoing and other objects in view, this invention consists in such novel features of construction, combination, and arrangement of parts as will be hereinafter more fully described, illustrated in the accompanying drawings, and claimed.

In describing the invention in detail, reference will be had to the accompanying drawings wherein like characters of reference designate like or corresponding parts throughout the several views.

Figure 1 is a side elevation of a silo showing the improved stairway wound thereabout, and having a part of the protective casing for the stairway broken away. Fig. 2 is a top plan view of the silo showing the roof of the protective casing broken away to disclose the steps. Fig. 3 is a central sectional view on the line 3—3 of Fig. 1, and, Fig. 4 is a detail fragmentary sectional view of a part of the stairway, showing the trap door construction formed therein.

Referring more particularly to the drawings, 1 designates the retaining body of the silo, which is cylindrical in shape, and which has winding spirally about its outer surface a casing 2. The casing 2 has mounted therein a stairway 3, which stairway constitutes the ordinary steps, having the risers 4 and the tread surfaces proper 5. The steps 3 are positioned directly below openings 6, which openings are formed in the side walls of the silo retaining body 1, and extend outwardly and around the sides of the silo, as is clearly shown in Fig. 3 of the drawings, so that they will be positioned conveniently for access thereto by a person mounting the steps 3. A chute 7 is mounted within the casing 2, and it is substantially semi-circular in shape, being constructed of any suitable type of material, such as sheet metal or the like, and extends downwardly and spirally around within the casing 2, having an egressing opening 8 formed near its lower terminal end. The steps directly opposite to each of the openings 6, are hingedly connected to their approach as shown at 9 in Fig. 4 of the drawings, so that the tread portion 5 of the step may be raised to permit of communication with the chute which is mounted beneath the steps, for the throwing of ensilage from the doors into the chute so that the same will pass downwardly in the chute to the bottom of the silo and out of the opening 8 into any suitable type of receptacle (not shown) from which it may be distributed to the domestic animals. The approach 10, which is formed adjacent the trapdoor 5, has a transversely projecting flange 11, upon which the marginal edge of the hinged section of the steps rest, so as to prevent the steps from falling inwardly when a person passes upon the same.

From the foregoing description, taken in connection with the accompanying drawings, it will be readily apparent that a silo which has a spiral stairway mounted about the outer surface of the same, and which is provided with doors spaced one above the other in spiral arrangement within the side walls of the silo, will provide for the convenient removal of the ensilage from the silo and eliminate the use of a ladder, which is oftentimes objectionable to parties having to remove the ensilage from the silo.

In reducing the invention to practice, certain minor features of construction, combination and arrangement of parts may necessitate alterations, to which the patentee is entitled provided such alterations are comprehended within the scope of what is claimed.

What is claimed is:—

1. In a silo construction, the combination, of a cylindrical ensilage retainer provided with a plurality of openings cut therein, said openings being arranged at different elevations within said ensilage retainer and spirally about the circumference of the same, a stairway secured to the outer surface of said ensilage retainer and positioned a short distance below said openings for permitting convenient access to said openings, a protecting casing disposed about said stairway, a chute secured to said stairway and positioned beneath the same, and trap doors formed in said stairway adjacent said openings, for permitting of the passage of ensilage through said stairway into said chute.

2. In a silo construction, the combination, of a cylindrical ensilage retainer having a plurality of openings cut therein, said openings being arranged spirally about the circumference of said retainer, means secured to the outer surface of said retainer for permitting of access to said openings for entrance into said retainer, a chute secured to the under surface of said last named means, and trap doors formed in said means adjacent said openings for permitting of the passage of ensilage through said means into said chute.

3. In a silo construction, the combination, of an ensilage retainer having a plurality of openings cut therein and arranged spirally about the circumference of the retainer, a casing secured to the outer surface of said retainer and winding spirally about the same, said openings communicating with the interior of said casing, a stairway positioned within said casing, a chute positioned within said casing beneath said stairway, certain of the tread portions of said stairway being hingedly connected to the corresponding flight sections of the same for forming trap doors for permitting access to said chute.

In testimony whereof I affix my signature in presence of two witnesses.

FREDRICK W. WILLIAMS.

Witnesses:
D. W. Steele,
E. A. Christensen.

Copies of this patent may be obtained for five cents each, by addressing the "Commissioner of Patents, Washington, D. C."